United States Patent [19]
Itoh et al.

[11] Patent Number: 5,206,752
[45] Date of Patent: * Apr. 27, 1993

[54] OPTICAL ROTATOR FORMED OF A TWISTED NEMATIC LIQUID CRYSTAL POLYSTER INCLUDING AN ORTHO-SUBSTITUTED AROMATIC UNIT

[75] Inventors: Hiroyuki Itoh; Takehiro Toyooka, both of Yokohama; Shigeki Iida, Kawasaki, all of Japan

[73] Assignee: Nippon Oil Company, Limited, Tokyo, Japan

[*] Notice: The portion of the term of this patent subsequent to Nov. 12, 2008 has been disclaimed.

[21] Appl. No.: 703,179

[22] Filed: May 20, 1991

[30] Foreign Application Priority Data

May 18, 1990 [JP] Japan .................... 2-126962

[51] Int. Cl.$^5$ .................. G02F 1/13; C09K 19/52; C09K 19/00
[52] U.S. Cl. .................. 359/106; 252/299.01; 428/1
[58] Field of Search .......... 252/299.01; 428/1; 359/103, 106

[56] References Cited

U.S. PATENT DOCUMENTS

| | | | |
|---|---|---|---|
| 5,064,697 | 11/1991 | Takiguchi et al. | 428/473.5 |
| 5,066,107 | 11/1991 | Yoshinaga et al. | 359/103 |
| 5,098,975 | 3/1992 | Omelis et al. | 252/299.01 |
| 5,114,612 | 5/1992 | Benicewicz et al. | 252/299.01 |
| 5,132,147 | 7/1992 | Takiguchi et al. | 252/299.01 |
| 5,132,390 | 7/1992 | Domszy et al. | 252/299.01 |

FOREIGN PATENT DOCUMENTS 2272090  11/1990  Japan .................... 252/299.01

Primary Examiner—William L. Sikes
Assistant Examiner—Anita Pellman Gross
Attorney, Agent, or Firm—Scully, Scott, Murphy & Presser

[57] ABSTRACT

An optical rotator comprising a light transmitting base, an alignment film layer formed on said base, and a film layer formed of a liquid crystalline polymer. The film layer exhibits a twisted nematic orientation in the state of liquid crystal and assumes a glassy state at a temperature below a liquid crystal transition point of the polymer. The polymer is a polyester which includes an ortho-substituted aromatic unit.

5 Claims, 2 Drawing Sheets

OPTICAL ROTATOR FORMED OF A TWISTED NEMATIC LIQUID CRYSTAL POLYSTER INCLUDING AN ORTHO-SUBSTITUTED AROMATIC UNIT

BACKGROUND OF THE INVENTION

The present invention relates to a novel optical rotator of high efficiency and large area useful in the fields of display, opto-electronics and optics and capable of being produced and handled easily.

A rotating property of the direction of the vibration of polarizing light is called an optical rotatory power, and substances which exhibit such property are known as optical rotator. In the field of optics or opto-electronics there is used an optical element called an optical rotator for the purpose of causing an azimuthal rotation of linear polarization or of elliptic polarization by utilizing such optical rotator. Typical examples are a ¼ wavelength plate, an optically active crystal plate, and various phase plates. These are formed by grinding an optically active crystal such as rock crystal or a birefringent crystal such as calcite. Although these optical elements are highly accurate, an advanced technique is required for the manufacture thereof, and the cost is high. One having a large area cannot be manufactured and it is difficult to them for general purposes. On the other hand, as such optical element of low cost there are various phase films obtained by stretching plastic sheets. Although these films can be formed to have a large area, there is the problem that the accuracy thereof is poor. Further, in both the use of a birefringent crystal and a stretched plastic sheet, it is only at a predetermined single wavelength that the optical elements exhibits its function basically in high efficiency.

If there is obtained an optical rotator which permits a high accuracy in the wide range of wavelengths and in the fields of display, opto-electronics and optics, the usefulness thereof will be great to an immeasurable extent.

It is the object of the present invention to provide an optical rotator having such characteristics.

If a twisted nematic liquid crystal structure can be realized using a liquid crystalline polymer and immobilized as a transparent film, it becomes possible to attain high accuracy and large area which has heretofore been impossible, and by the optical rotator power of such twisted structure it is made possible to obtain a highly versatile, optical rotator in the wide range of wavelengths. Taking note of the foregoing properties as an optical rotator of the twisted nematic liquid crystal structure and also taking note of the point just mentioned above, the present inventors have made extensive studies and finally accomplished the present invention.

SUMMARY OF THE INVENTION

The present invention resides in an optical rotator comprising a light transmitting base, an alignment film layer formed on the base, and a film layer of a liquid crystalline polymer which exhibits a twisted nematic orientation in the state of liquid crystal and assumes a glassy state at a temperature below the liquid crystal transition point of the polymer.

The optical rotator of the present invention is fabricated by heat-treating on an alignment film a liquid crystalline polymer which exhibits a uniform, twisted nematic orientation of monodomain and which permits the state of such orientation to be immobilized easily, to form a uniform, twisted nematic structure of monodomain, followed by cooling to immobilize the oriented state without impairing the orientation in the state of liquid crystal.

DETAILED DESCRIPTION OF THE INVENTION

It is essential for the said liquid crystalline polymer to have the following property. For stable immobilization of the twisted nematic orientation, when viewed from the phase sequence of liquid crystal, it is important that there be no crystal phase in the portion lower in temperature than the twisted nematic phase. If such crystal phase is present, cooling for immobilization proceeds inevitably through the said crystal phase, resulting in breakage of the twisted nematic phase once obtained. Therefore, the liquid crystalline polymer used for the purpose in question is required as an essential condition to have not only good orientatability based on a surface effect but also glassy phase in the portion lower in temperature than the twisted nematic phase. Liquid crystalline polymers which exhibit a twisted nematic orientation are classified into two, one of which are polymers per se having optically active groups, and the other are those not having optically active groups but exhibiting a twisted nematic liquid crystallinity when mixed with other optically active compounds.

In the latter case there may be used any such polymer which exhibits a nematic orientation in the state of liquid crystal and assumes the state of glass at temperatures below the liquid crystal transition point thereof. Examples are main chain type liquid crystalline polymers such as polyesters, polyamides, polycarbonates, and polyester imides, as well as side chain type liquid crystalline polymers such as polyacrylates, polymethacrylates, polymalonates, and polysiloxanes. Particularly, polyesters are preferred in point of easy preparation, good orientation and high glass transition point. Polyesters containing an ortho-substituted aromatic unit as are most preferred. Polymers containing as a repeating unit an aromatic unit having a bulky substituent group in place of an ortho-substituted aromatic unit or an aromatic unit having fluorine or a fluorine-containing substituent group, are also employable. The "ortho-substituted aromatic unit" as referred to herein means a structural unit with main chain-constituting bonds ortho to each other. Examples are the following catechol, salicylic acid and phthalic acid units as well as substituted derivatives thereof:

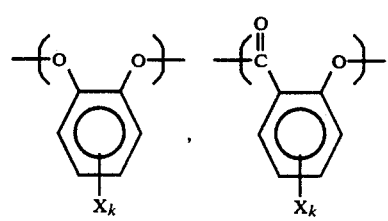

-continued

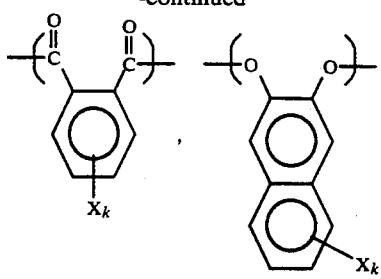

wherein X represents hydrogen, halogen, e.g. Cl or Br, an alkyl or alkoxy group having 1 to 4 carbon atoms, or phenyl, and k is 0 to 2.

The following are particularly preferred:

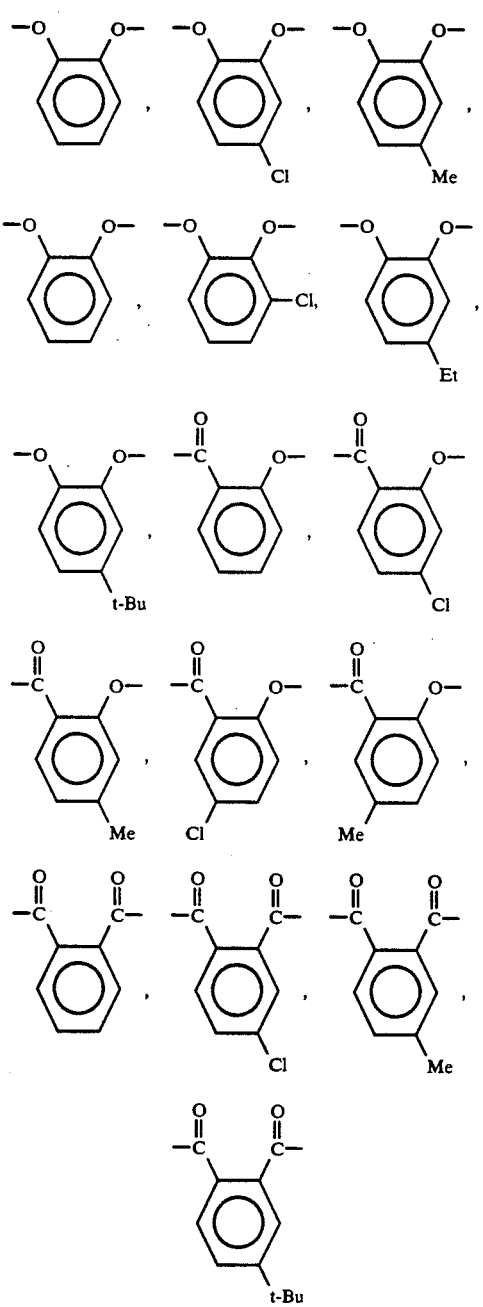

-continued

Me: methyl
Et: ethyl
Bu: butyl

Also, as examples of the polyester used preferably in the present invention there are mentioned those containing as repeating units (a) a structural unit (hereinafter referred to as "diol component") derived from a diol and a structural unit ("dicarboxylic acid component" hereinafter) derived from a dicarboxylic acid and/or (b) a structural unit ("hydroxycarboxylic acid component" hereinafter) derived from a hydroxycarboxylic acid containing both carboxyl and hydroxyl groups in one unit. Preferably, these polyesters further contain the foregoing ortho-substituted aromatic unit.

As examples of the diol component there are mentioned the following aromatic and aliphatic diols:

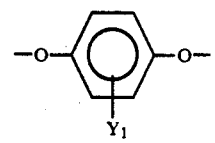

wherein Y represents hydrogen, halogen, e.g. Cl or Br, an alkyl or alkoxy group having 1 to 4 carbon atoms, or phenyl, and l is 0 to 2,

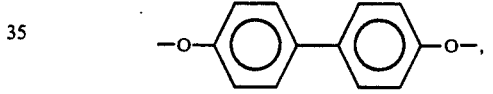

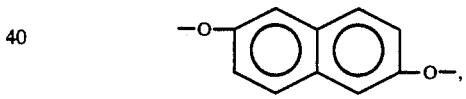

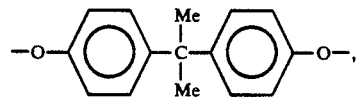

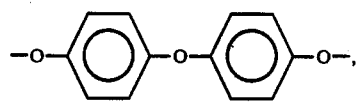

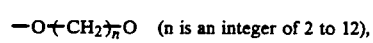

—O⫤CH₂⫥ₙO   (n is an integer of 2 to 12),

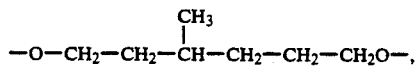

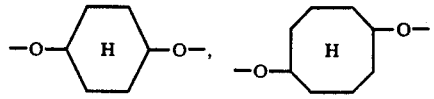

Particularly, the following are preferred:

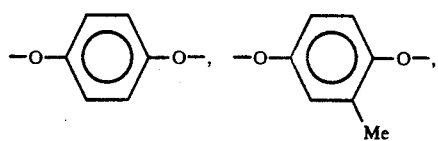

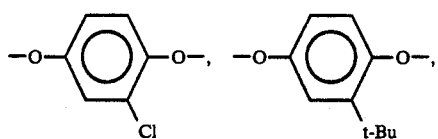

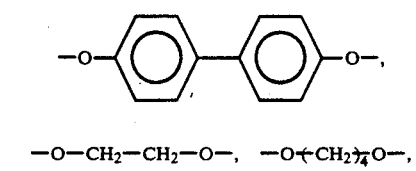

—O—CH$_2$—CH$_2$—O—, —O(CH$_2$)$_4$O—,

—O—CH$_2$—CH(CH$_3$)—CH$_2$—CH$_2$—O—, —O(CH$_2$)$_6$O—.

As examples of the dicarboxylic acid component, the following may be mentioned:

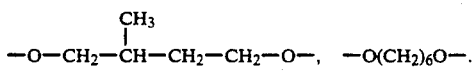

wherein Z represents hydrogen, halogen, e.g. Cl or Br, an alkyl or alkoxy group having 1 to 4 carbon atoms, or phenyl, and m is 0 to 2,

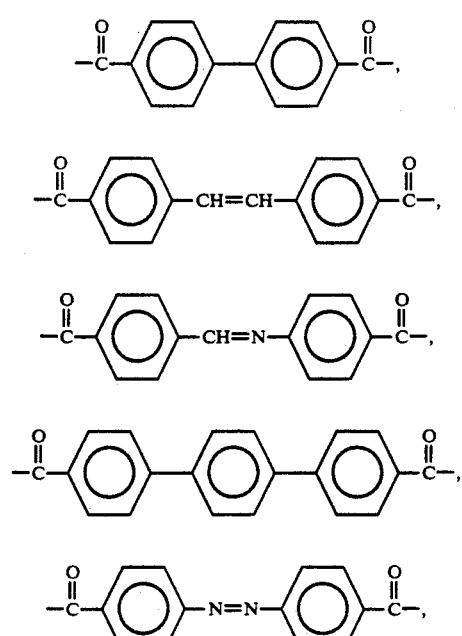

-continued

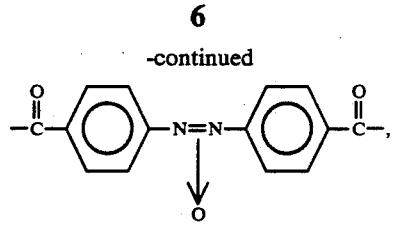

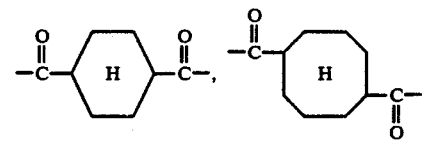

Particularly, the following are preferred:

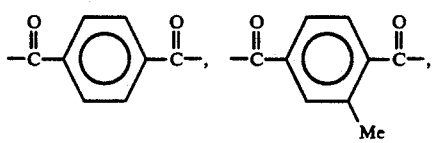

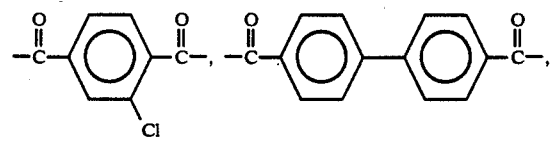

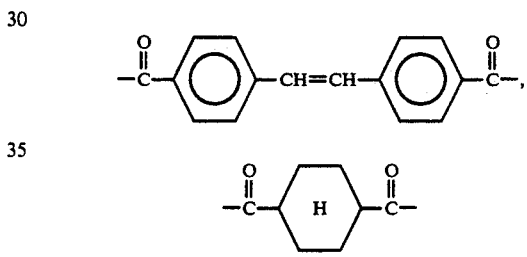

As examples of the hydroxycarboxylic acid component, the following units may be mentioned:

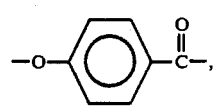

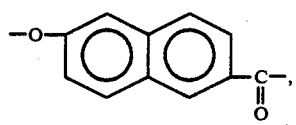

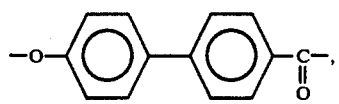

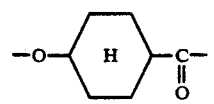

The dicarboxylic acid to diol mole ratio is approximately 1:1 like that of polyesters commonly used (carboxyl to hydroxyl ratio in the case of using a hydroxycarboxylic acid). The proportion of ortho-substituted aromatic units in the polyester is preferably in the range of 5 to 40 mole %, more preferably 10 to 30 more %.

In the case where the said proportion is smaller than 5 mole %, a crystal phase tends to appear under the nematic phase, so such proportion is not desirable. A proportion larger than 40 mole % is not desirable, either, because the polymer will no longer exhibit liquid crystallinity. The following are typical examples of polyesters which may be used in the present invention:

Polymer consisting essentially of the following structural units:

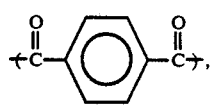

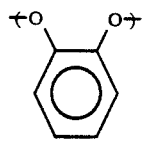

Polymer consisting essentially of the following structural units:

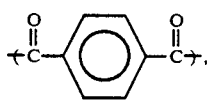

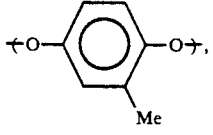

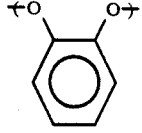

Polymer consisting essentially of the following structural units:

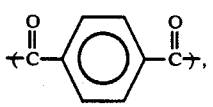

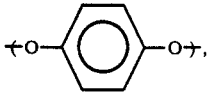

-continued

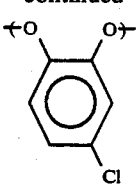

Polymer consisting essentially of the following structural units:

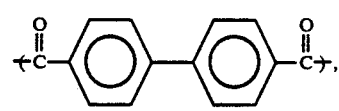

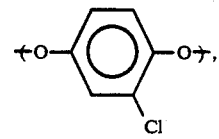

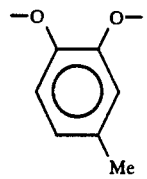

Polymer consisting essentially of the following structural units:

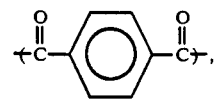

$+OCH_2CHCH_2CH_2O+$,
       |
       $CH_3$

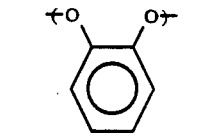

Polymer consisting essentially of the following structural units:

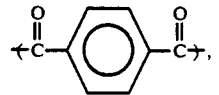

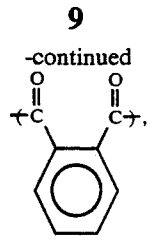

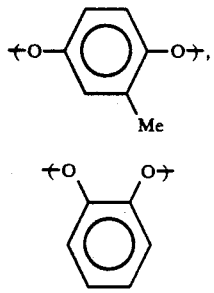

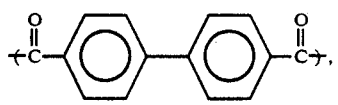

Polymer consisting essentially of the following structural units:

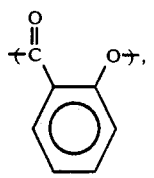

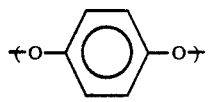

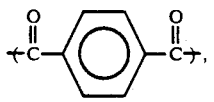

Polymer consisting essentially of the following structural units:

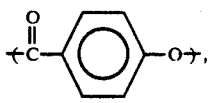

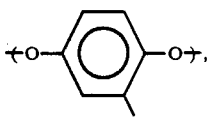

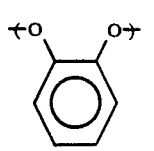

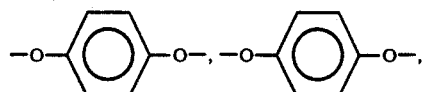

Also preferred are polymers which, in place of ortho-substituted aromatic units, contain as repeating units such bulky substituent-containing aromatic units or aromatic units containing fluorine or fluorine-containing substitutents as shown below:

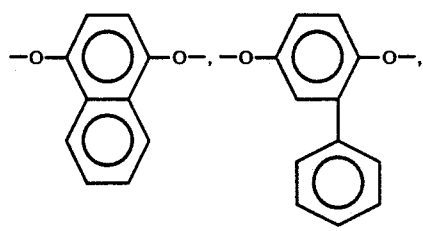

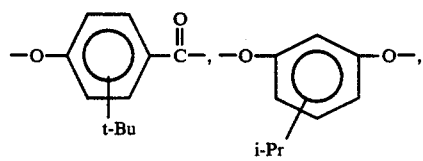

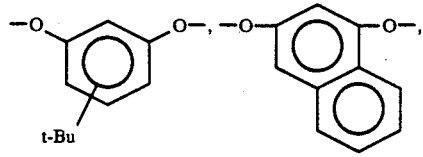

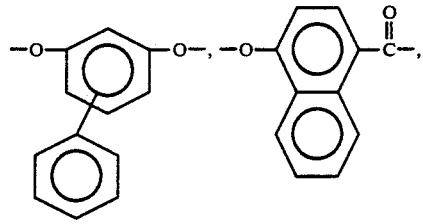

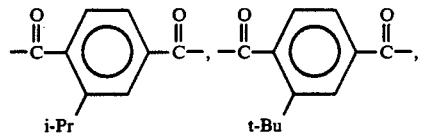

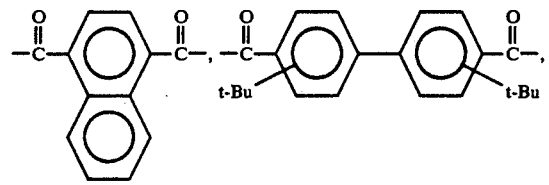

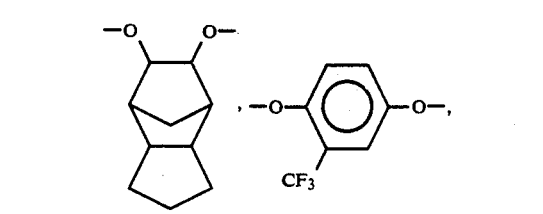

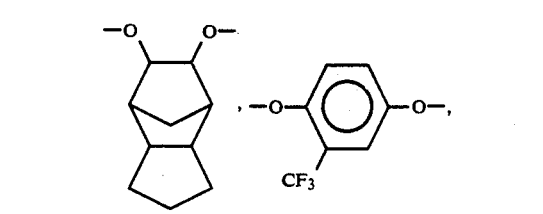

-continued

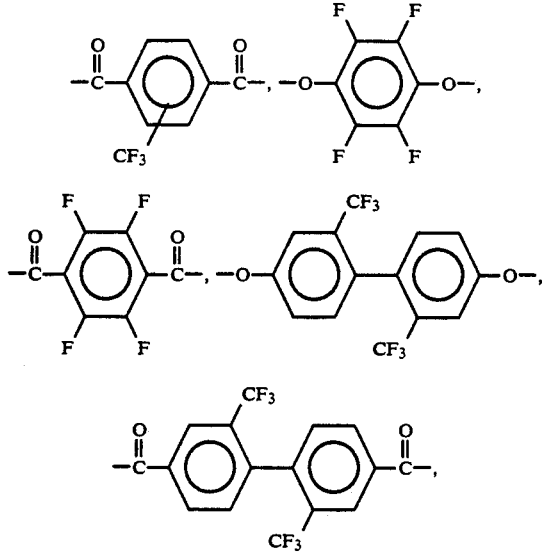

The polymers exemplified above range in molecular weight preferably from 0.05 to 3.0, more preferably 0.07 to 2.0, in terms of inherent viscosity as determined at 30° C. in a solvent, e.g. a mixed phenol/tetrachloroethane [60/40 (weight ratio)] solvent. An inherent viscosity lower than 0.05 is not desirable because the strength of the resulting film of high molecular liquid crystal will be low, while if the inherent viscosity is higher than 3.0, there will arise such problems as the deterioration of orientatability and an increase of the time required for orientation because of too high viscosity during the formation of liquid crystal. The glass transition points of these polyesters are also important, exerting influence on the stability of orientation after the immobilization thereof. Assuming that the working temperature is room temperature or thereabouts, though it also depends on the use, it is desirable that the glass transition points of the polyesters be not lower than 30° C., more preferably not lower than 50° C. In the case of a glass transition point lower than 30° C., the use of the optical rotator at room temperature or thereabouts may cause a change of the liquid crystal structure once immobilized, thus resulting in the deterioration of a function based on the liquid crystal structure. Therefore, such low glass transition point is not desirable.

How to prepare the polymer used in the present invention is not specially limited. There may be adopted any of the polymerization processes known in this field, e.g. a melt polymerization process or an acid chloride process using an acid chloride of a corresponding dicarboxylic acid.

According to a melt polycondensation process, the polyester can be prepared by polymerizing a corresponding dicarboxylic acid and an acetylated compound of a corresponding diol at a high temperature and in a high vacuum. The molecular weight thereof can be adjusted easily by controlling the polymerization time or the feed composition. For accelerating the polymerization reaction there may be used a known metal salt such as sodium acetate. In the case of using a solution polymerization process, the polyester can be prepared easily by dissolving predetermined amounts of a dicarboxylic acid dichloride and a diol in a solvent and heating the resulting solution in the presence of an acid acceptor such as pyridine.

An explanation will now be made about an optically active compound which is incorporated in the nematic liquid crystalline polymers exemplified above for imparting twist thereto. Typical examples are optically active low-molecular compounds. Any compound having optical activity can be used in the present invention, but from the standpoint of compatibility with the base polymer it is desirable to use optically active, liquid crystalline compounds. The following are concrete examples:

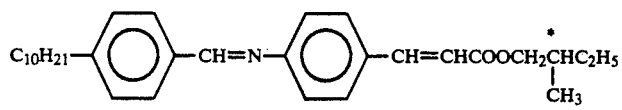

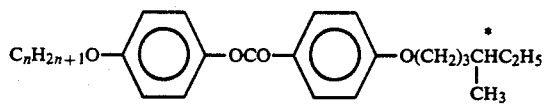

(n = 7, 8)

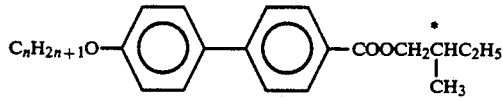

(n = 8, 10)

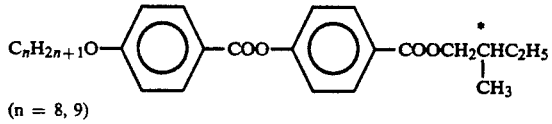

(n = 8, 9)

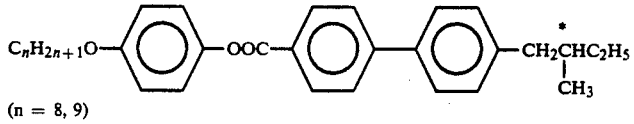

(n = 8, 9)

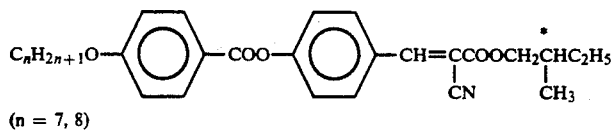
(n = 7, 8)

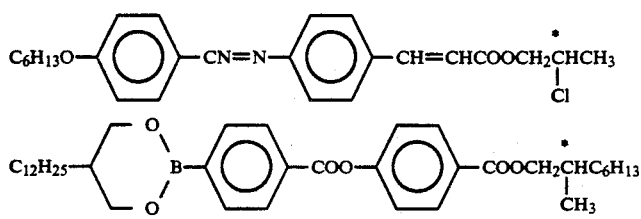

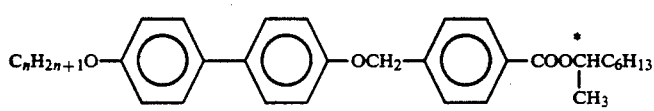

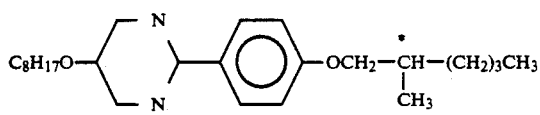

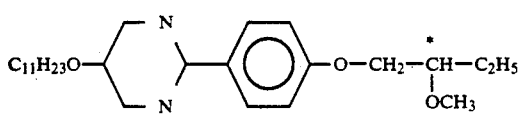

cholesterol derivatives.

As examples of the optically active compound used in the present invention there also may be mentioned optically active high-molecular compounds. Any high polymer may be used if only it contains an optically active group in the molecule, but when the compatibility with the base polymer is taken into account, it is desirable to use a high polymer which exhibits liquid crystallinity. Examples are the following liquid crystalline high polymers having optical activity: polyacrylates, polymethacrylates, polymalonates, polysiloxanes, polyesters, polyamides, polyester amides, polycarbonates, polypeptides, and cellulose. Above all, from the standpoint of compatibility with the nematic liquid crystalline polymer serving as the base, mainly aromatic, optically active polyesters are most preferred. Examples are the following polymers:

Polymer comprising the following structural units:

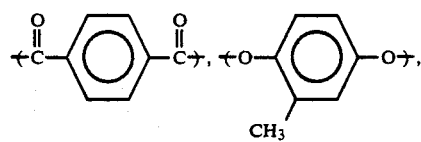

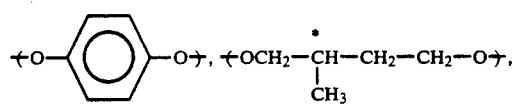

Polymer comprising the following structural units:

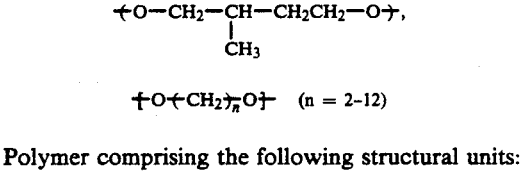

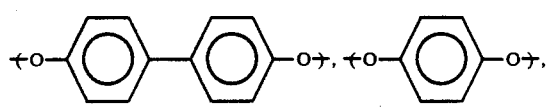

+O+CH$_2$+$_n$O+  (n = 2-12)

Polymer comprising the following structural units:

+O-⌬-⌬-O+, +O-⌬-O+,

-continued

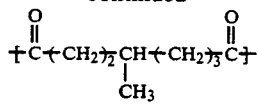

Polymer comprising the following structural units:

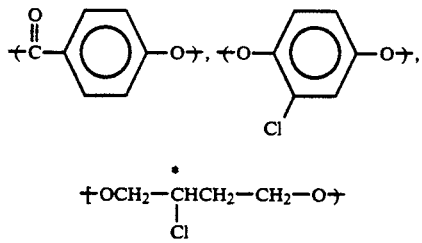

Polymer comprising the following structural units:

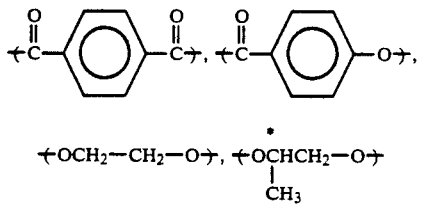

Polymer comprising the following structural units:

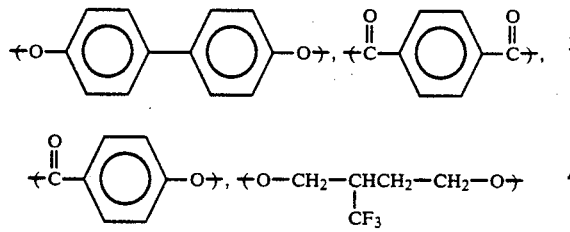

Polymer comprising the following structural units:

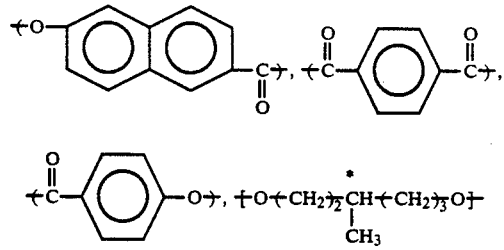

Polymer comprising the following structural units:

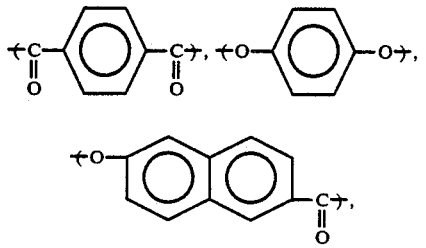

-continued

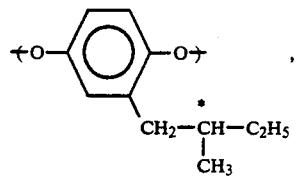

Polymer comprising the following structural units:

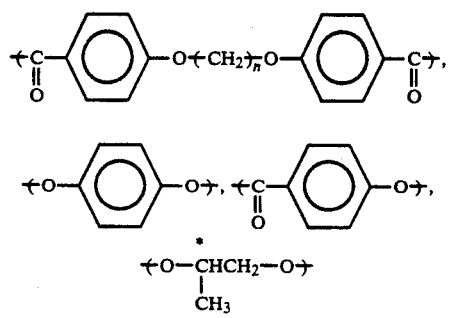

Polymer comprising the following structural units:

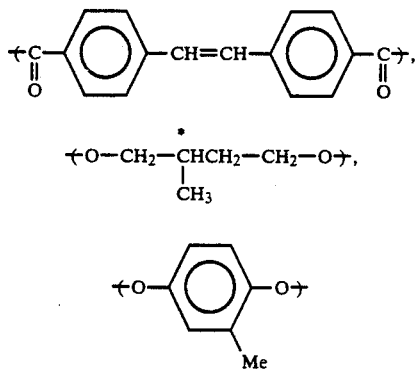

In each of these polymers, the proportion of the unit having an optically active group is usually in the range of 0.5 to 80 mole %, preferably 5 to 60 mole %.

These polymers preferably range in molecular weight from 0.05 to 5.0 in terms of inherent viscosity as determined at 30° C. in phenol/tetrachloroethane for example. An inherent viscosity larger than 5.0 is not desirable because of too high viscosity which eventually causes deterioration of orientatability. An inherent viscosity smaller than 0.05 is not desirable, either, because it becomes difficult to control the composition.

In the present invention, the liquid crystalline polymer which exhibits a twisted nematic orientation in the state of liquid crystal and assumes a glassy state at a temperature below the liquid crystal transition point of the polymer, can be prepared by mixing a nematic liquid crystalline polymer and an optically active compound at a predetermined ratio by a solid mixing, solution mixing or melt-mixing method. The proportion of the optically active component in the composition is in the range of preferably 0.1 to 50 wt %, more preferably 0.5 to 30 wt %, although it differs depending on the proportion of optically active groups contained in the optically active compound or the twisting force of the optically active compound for imparting twist to the nematic liquid crystal. If the proportion of the optically active compound is less than 0.1 wt %, it will be impossible to impart a sufficient twist to the nematic liquid crystal, and a proportion thereof greater than 50 wt % will exert a bad influence on the orientation.

The optical rotator of the present invention can also be prepared by using a high molecular liquid crystal which provides a uniform, twisted nematic orientation of monodomain for itself without using any other optically active compound and which permits the state of such orientation to be immobilized easily. It is essential that the polymer in question have an optically active group in the molecule and be optically active. Examples are main chain type liquid crystalline polymers such as polyesters, polyamides, polycarbonates and polyester imides, as well as side chain type liquid crystalline polymers such as polyacrylates, polymethacrylates and polysiloxanes. Polyesters are particularly preferred in point of easiness of preparation, superior orientatability and high glass transition point. Most preferred polyesters are those which contain ortho-substituted aromatic units as constituents. But also employable are polymers which, in place of such ortho-substituted aromatic units, contain as constituents bulky substituent-containing aromatic units or aromatic units having fluorine or fluorine-containing substituent groups. These optically active polyesters can be obtained by introducing in the nematic liquid crystalline polyesters so far explained such optically active groups as shown below using diols, dicarboxylic acids and hydroxycarboxylic acids (the * mark in the following formulae represents an optically active carbon):

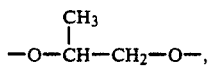

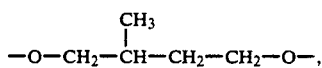

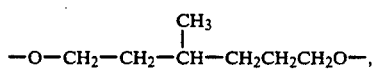

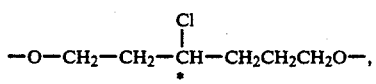

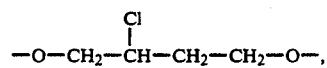

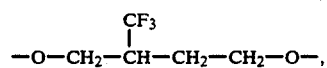

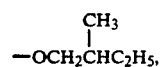

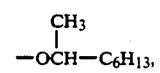

-continued

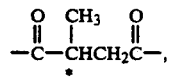

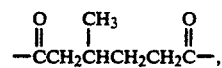

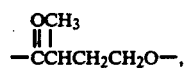

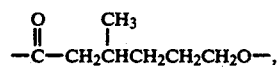

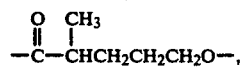

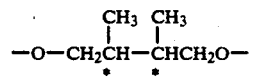

The proportion of these optically active groups in the polymers is in the range of preferably 0.1 to 20 mole %, more preferably 0.5 to 10 mole %. If the said proportion is less than 0.1 mole %, there will not be obtained a twisted structure required for the compensator, and a proportion thereof large than 20 mole % is not desirable because a too strong twisting power will cause the deterioration of the compensating effect. The molecular weights of these polymers are in the range of preferably 0.05 to 3.0, more preferably 0.07 to 2.0, in terms of intrinsic viscosity as determined at 30° C. in, for example, a mixed phenol/tetrachloroethane (60/40) solvent. A smaller intrinsic viscosity than 0.05 is not desirable because the strength of the resulting high molecular liquid crystal will be low, while if the intrinsic viscosity is larger than 3.0, there will arise problems such as the deterioration of orientatability and an increase of the time required for orientation because of too high viscosity during the formation of liquid crystal. Also important are the glass transition points of these polyesters, which exert influence on the stability of orientation after the immobilization of orientation. Assuming that the working temperature is room temperature or thereabouts, it is desirable that the glass transition point be not lower than 30° C., more preferably not lower than 50° C., though this differs depending on the use. If the glass transition point is lower than 30° C., the use of the compensator at room temperature or thereabouts may cause a change of the liquid crystal structure which has once been immobilized, thus resulting in the deterioration of a function based on the liquid crystal structure.

These polymers can be prepared by the foregoing melt polycondensation process or acid chloride process.

The following are typical examples of the liquid crystalline polymer used in the present invention described above.

Polymers represented by:

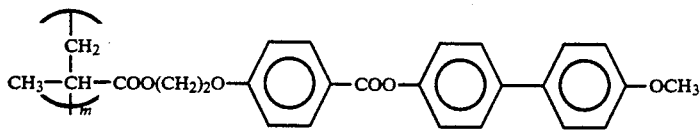

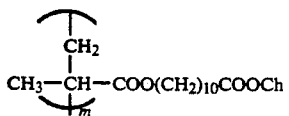

Ch: cholesteryl.
m/n=usually 99.9/0.1 to 80/20, preferably 99.5/0.5 to 90/10, more preferably 99/1 to 95/5.
Polymers represented by:

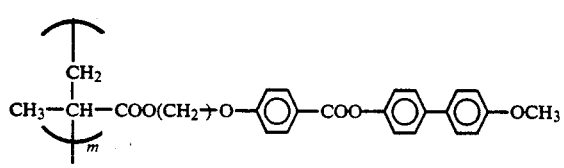

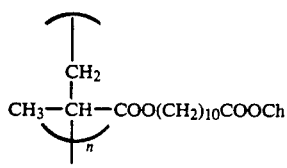

Ch: cholesteryl.
m/n=usually 99.9/0.1 to 80/20, preferably 99.5/0.5 to 90/10, more preferably 99/1 to 95/5.
Polymers represented by:

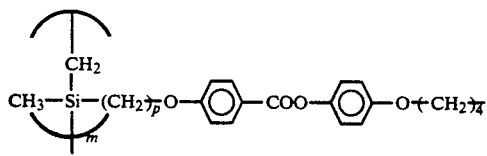

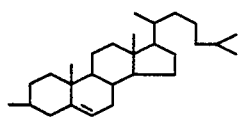

m/n=usually 99.9/0.1 to 70/30, preferably 99.5/0.5 to 90/10, more preferably 99/1 to 95/5.

p, q: integer of 2 to 20.
Polymers represented by:

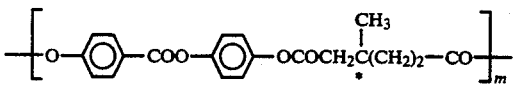

m/n=usually 99.9/0.1 to 70/30, preferably 99.5/0.5 to 90/10, more preferably 99/1 to 95/5.
p, q: integer of 2 to 20.
Polymers represented by:

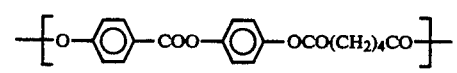

m/n=usually 99.9/0.1 to 80/20, preferably 99.5/0.5 to 90/10, more preferably 99/1 to 95/5.
Polymers represented by:

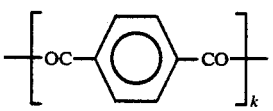

m/n=0.5/99.5 to 10/90, preferably 1/99 to 5/95.
Polymers represented by:

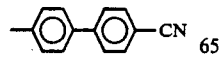

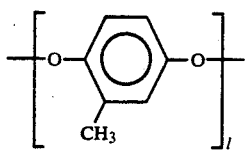
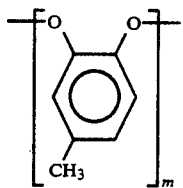
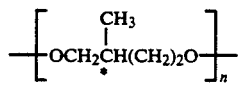

k=l+m+n.
k/n=99.5/0.5 to 90/10, preferably 99/1 to 95/5.
l/m=5/95 to 95/55.
Polymers represented by:

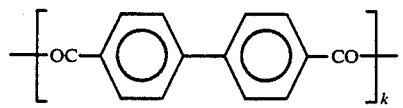
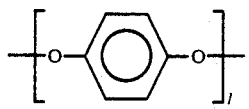
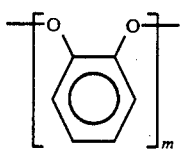
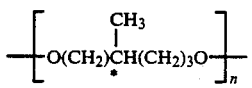

k=l+m+n.
k/n=99.5/0.5 to 90/10, preferably 99/1 to 95/5.
l/m=5/95 to 95/55.
Polymer mixtures represented by:

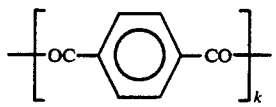           (A)
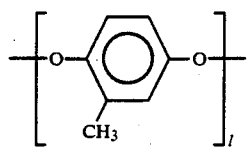

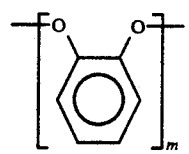
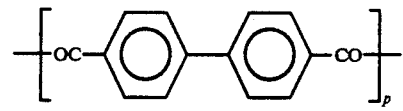          (B)
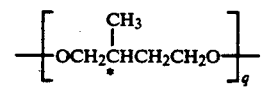
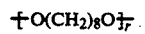

(A)/(B)=usually 99.9/0.1 to 80/20 (weight ratio), preferably 99.5/0.5 to 85/5, more preferably 99/1 to 95/5.
k=l+m.
l/m=75/25 to 25/75.
p=q+r.
p/q=80/20 to 20/80.
Polymer mixtures represented by:

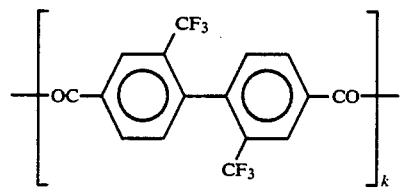          (A)
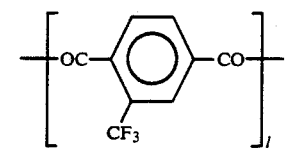
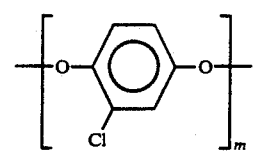

cholesteryl benzoate           (B)

(A)/(B)=usually 99.9/0.1 to 70/30 (weight ratio), preferably 99.5/0.5 to 80/20, more preferably 99/1 to 90/10.
m=k+l.
k/l=80/20 to 20/80.
Polymer mixtures represented by:

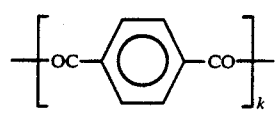          (A)

-continued

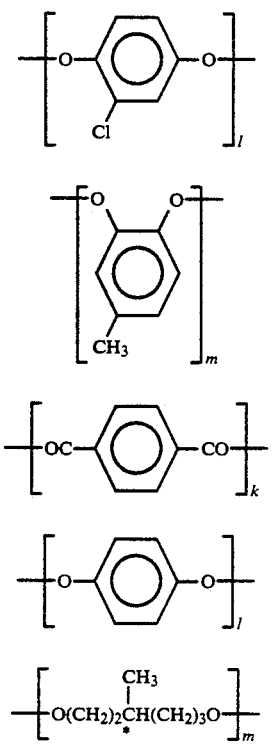

(B)

(A)/(B)=usually 99.5/0.1 to 70/30 (weight ratio), preferably 99.5/0.5 to 80/20, more preferably 99/1 to 90/10.

k=l+m.
l/m=25/75 to 75/25.
p=q+r.
p/r=20/80 to 80/20.

The mark * represents an optically active carbon.

These polymers range in molecular weight preferably from 0.05 to 3.0, more preferably 0.07 to 2.0, in terms of inherent viscosity as determined at 30° C. in a solvent, e.q. tetrahydrofuran, acetone, cyclohexanone, or mixed phenol/tetrachloroethane (60/40) solvent. If the inherent viscosity is smaller than 0.05, the strength of the resulting liquid crystalline polymer will be low, and a larger value than 3.0 will result in too high viscosity during the formation of liquid crystal, thus causing deteriorated orientatability and increase in the time required for orientation.

The optical rotator of the present invention basically has a laminate structure comprising a light transmitting base, an alignment layer formed on the light transmitting base, and a liquid crystalline polymer film. As the light transmitting base there may be used, for example, glass, a light transmitting plastic film, or a plastic sheet. As to the plastic base, it is desirable for it to be isotropic optically. Examples of such plastics employable include polymethyl methacrylates, polystyrenes, polycarbonates, polyether sulfones, polyphenylene sulfides, polyolefins, and epoxy resins. Suitable examples of the alignment layer are polyimide films which have been subjected to a rubbing treatment. The alignment films known in this field such an obliquely vapor-deposited film of silicon dioxide and a rubbing-treated film of polyvinyl alcohol are also employable, of course. An alignment film obtained by rubbing a light transmitting base directly is also employable. The optical rotator of the present invention is produced by forming a twisted nematic, liquid crystalline polymer layer on the alignment film layer formed on the light transmitting base.

First, a twisted nematic, liquid crystalline polymer is dissolved at a predetermined proportion in a solvent to prepare a solution. In this case, the solvent to be used differs depending on the kind of the polymer used, but usually there may be used, for example, any of ketones such as acetone, methyl ethyl ketone, and cyclohexanone; ethers such as tetrahydrofuran, and dioxane; halogenated hydrocarbons such as chloroform, dichloroethane, tetrachloroethane, trichloroethylene, tetrachloroethylene and o-dichlorobenzene, mixed solvents thereof with phenol, dimethylformamide, dimethylacetamide, and dimethyl sulfoxide. The concentration of the solution differs greatly depending on the viscosity of the polymer used, but usually it is in the range of 5% to 50%, preferably 10% to 30%. The solution is then applied onto a light transmitting glass plate, plastic plate or plastic film which has been subjected to an orientation treatment. The orientation treatment may be performed by any method if only the liquid crystal molecules are orientated in parallel with the surface. A suitable example is a glass plate or film on which polyimide was applied and then subjected to a rubbing treatment. As the application method there may be adopted, for example, any of spin coating method, roll coating method, printing method and dipping/pulling-up method. After the application of the solution, the solvent is removed by drying and heat-treatment is performed at a predetermined temperature for a predetermined time to complete a twisted nematic orientation of monodomain. For promoting the orientation based on an surfacial effect, the lower the polymer viscosity, the better. It follows that the higher the temperature, the better. But a too high temperature is not desirable because it would cause an increase of cost and deterioration of the working efficiency. Further, since some polymers have an isotropic phase at a higher temperature region than the nematic phase, there will not be obtained orientation even if heat treatment is performed in that temperature region. Thus, it is desirable to perform the heat treatment in accordance with the characteristics of the polymer used, at a temperature above the glass transition point of the polymer and below the point of transition to an isotropic phase. A suitable temperature range is from 50° C. to 300° C., particularly from 100° C. to 250° C. The time necessary for obtaining a satisfactory orientation in the state of liquid crystal on the alignment layer differs depending on the polymer composition and molecular weight, but preferably it is in the range of 10 seconds to 60 minutes, more preferably 30 seconds to 30 minutes. If the said time is shorter than 10 seconds, the orientation will be unsatisfactory, and if it is longer than 60 minutes, the productivity will become lower.

The same state of orientation can be obtained also by applying the polymer in a melted condition onto the base which has been subjected to the orientation treatment and thereafter heat-treating the polymer. By performing these treatments using the high-molecular liquid crystal of the present invention there can be obtained a uniform, twisted nematic orientation throughout the whole surface on the alignment layer. In this case, the angle or direction of the twist can be controlled by adjusting the kind and proportion of the optically active unit contained in the polymer or the kind of an optically active compound to be mixed with the polymer.

By subsequent cooling to a temperature below the glass transition point of the said high-molecular liquid crystal the orientated state thus obtained can be immobilized without impairing the orientation. Generally, in the case of using a polymer having a crystal phase in a lower temperature region than the liquid crystal phase, the orientation in the state of liquid crystal will be broken by cooling. According to the process of the present invention, because there is used a polymeric system having a glass phase under the liquid crystal phase, such phenomenon will not occur and it is possible to immobilize the twisted nematic orientation completely. The cooling speed is not specially limited. The orientation can be immobilized by merely exposing the polymer into an atmosphere held at a temperature below the glass transition point of the polymer out of the heating atmosphere. For enhancing the production efficiency there may be adopted a forced cooling such as air-cooling or water-cooling.

The film thickness of the liquid crystalline polymer after the immobilization is not specially limited if only it is within a range in which the liquid crystalline polymer layer functions as a light waveguide based on the twisted nematic structure. This range (particularly the lower limit) is generally known as Morgan limit, which differs depending on the wavelength of light. For example, in a field where visible rays are important, such as the display field, the Morgan limit is 2 μm or more in terms of a retardation value (the product of birefringence and film thickness). Assuming that the birefringence of the liquid crystalline polymer itself does not exceed 1.0, it is preferable that the film thickness after the immobilization be not smaller than 2 μm, more preferably not smaller than 3 μm. A film thickness of 2 μm or more can afford a very exact optical rotatory power. However, in uses not requiring complete accuracy, even if the film thickness is smaller than 2 μm, the liquid crystalline polymer layer having such a thickness is fully employable, provided in this case it is preferred that the film thickness be not smaller than 0.5 μm. Although the upper limit of the film thickness is not specially limited, a too large thickness is not desirable because the unchoring effect of the alignment film will become weak. In this sense, a film thickness range up to 1000 μm is preferred, and a range up to 500 μm is particularly preferred.

The twist angle and direction of the liquid crystalline polymer which determine an azimuthal rotational angle and rotating direction of polarization can be controlled by adjusting the kind and proportion of the optically active unit in the polymer or the kind and amount of an optically active compound to be mixed with the polymer. In the case where the polymer used is per se active optically, the proportion of the optically active unit is preferably in the range of 0.1 to 50 mole %, more preferably 0.2 to 30 mole %. In the case of a mixture consisting of an optically inactive polymer and an optically active compound, the proportion of the optically active unit preferably in the range of 0.1 to 50 wt %, more preferably 0.2 to 30 wt %. By adjusting the said proportion it is made possible to control the rotational angle of polarization direction to a desired value larger than 0° and up to 180°.

The optical rotator of the present invention prepared as above is extremely high in accuracy as an optical rotator because the immobilization of the twisted nematic structure can be done completely, and it is possible to easily obtain such optical rotator of a large area. The optical rotator may be used as it is or after forming on the surface thereof a protective layer of a transparent plastic material for surface protection. Also, it may be used in a combined form with another optical element such as a polarizer. Thus, the optical rotator of the present invention is extremely useful in the field of optics or opto-electronics. Particularly, in the field of display, the optical rotator of the present invention contributes to the improvement in contrast and brightness of a high-grade liquid crystal display and a projection type liquid crystal display. Further, it is also suitable for CRT filter and the like. Thus, the optical rotator of the present invention is of great industrial value.

EXAMPLES

Working examples of the present invention and a comparative example will be described below, but the invention is not limited thereto.

EXAMPLE 1

There was prepared a phenol/tetrachloroethane (60/40 weight ratio) solution containing 17 wt % of a polymer mixture represented by the following formulae (m:n=99.5:0.5, inherent viscosity of the base polymer: 0.15, inherent viscosity of the optically active polymer: 0.13):

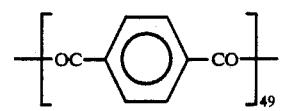

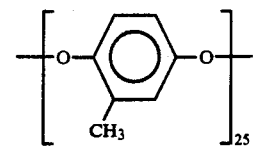

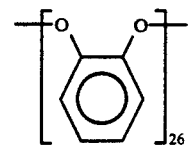

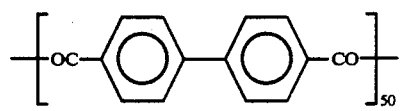

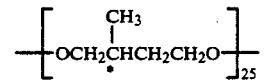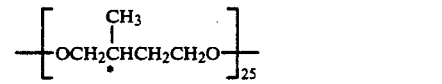

-continued $+O(CH_2)_8O+_{25}-$ m-n:mixture.

This solution was cast over a glass plate having a size of 15 cm×23 cm and a thickness of 0.1 cm and having a polyimide layer which had been subjected to a rubbing treatment, by means of a screen printer, then dried, heat-treated at 200° C. for 30 minutes and thereafter cooled for the immobilization of orientation. An optical rotatory layer of this optical rotator had a thickness of 8.8 μm, a twist angle of 90° and Δn·d of 2.1 μm. Using this optical rotator, there was formed a three-layer structure so that the angle between the transmission axis direction of a lower polarizer and the rubbing direction of the base glass of the optical rotator was 0° and the angle between the transmission axis of the lower polarizer and that of an upper polarizer was 90°.

Figure 1:
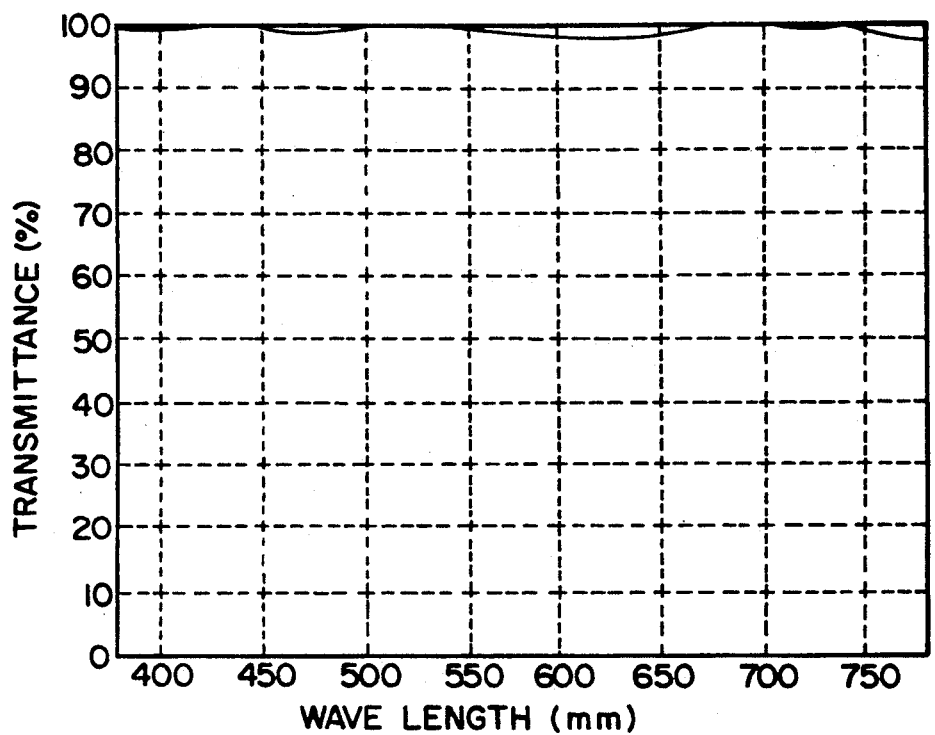
FIG. 1 illustrates an optical rotatory power, i.e., relation between transmissivity and wavelength, of an optical rotator in Example 1 of the present invention.

Next, white light was made incident from the lower polarizer side and a transmission spectrum of transmitted light from the upper polarizer side was measured. As a result, there was obtained such a spectrum as shown in FIG. 1. The transmissivity was almost 100% in all visible light regions. It turned out that the optical rotator in this Example caused a 90° azimuthal rotation of incident, linearly polarized light at high accuracy in all wavelength regions.

EXAMPLE 2

There was prepared a dimethylformamide solution containing 20 wt % of a polymer represented by the following formula (m:n=99.0:1.0, inherent viscosity: 0.20):

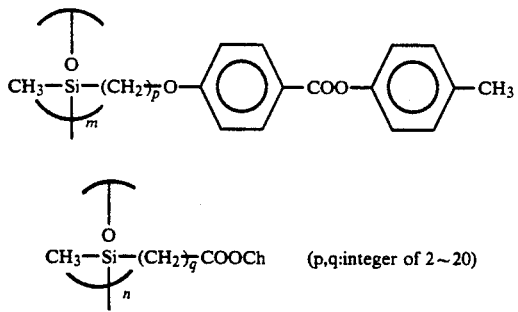

(p,q:integer of 2~20)

This solution was cast over a polyether sulfone film having a size of 20 cm×30 cm and a thickness of 100 μm and having a polyimide layer which had been subjected to a rubbing treatment, by means of a screen printer, then dried, heat-treated at 100° C. for 15 minutes and thereafter cooled to immobilize a liquid crystalline polymer layer having a twisted nematic structure. An optical rotatory layer of this optically active element (optical rotator) had a thickness of 20 μm, a twist angle of 70° and Δn·d of 3.2 μm.

Optical rotators fabricated in this way were arranged in three layers so that the angle between the transmission axis direction of a lower polarizer and the rubbing direction of the base film was 0° and the angle between the transmission axis of the lower polarizer and that of an upper polarizer was 90°.

Figure 2:
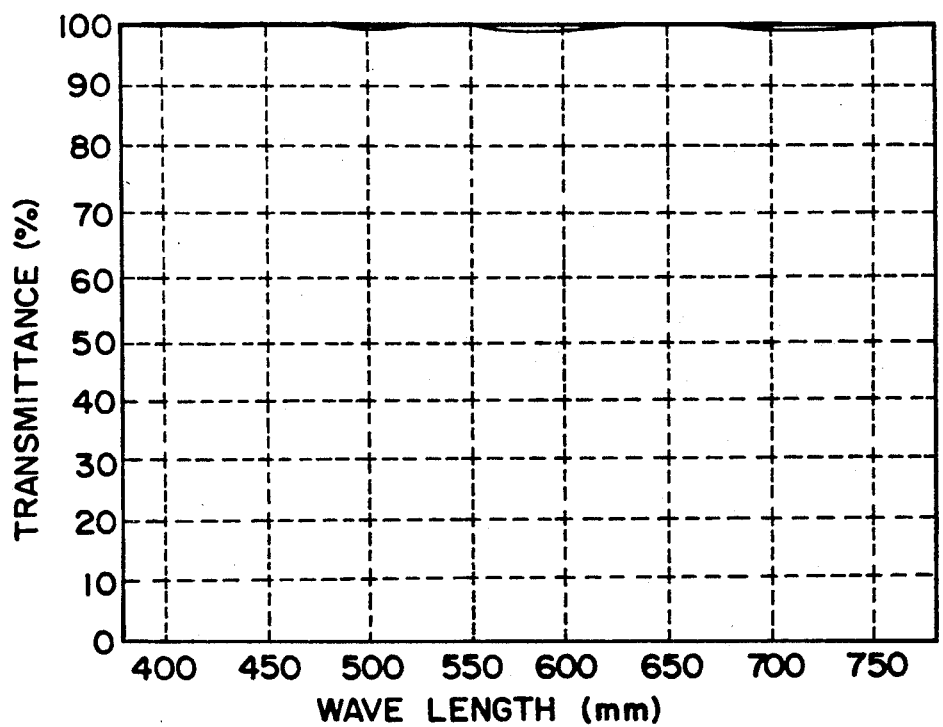
FIG. 2 illustrates an optical rotator in Example 2 of the present invention.

Next, white light was made incident from the lower polarizer side and a transmission spectrum of transmitted light from the upper polarizer side was measured. As a result, there was obtained such a spectrum as shown in FIG. 2. The transmissivity was almost 100% in all visible light regions. It turned out that the optical rotator in this Example caused a 70° azimuthal rotation of incident, linearly polarized light at high accuracy in all wavelength regions.

COMPARATIVE EXAMPLE 1

Using a ¼ wavelength plate (λ=550 nm) available commercially, there was formed a three-layer structure so that the angle between the transmission axis direction of a lower polarizer and the O-optical axis direction of the ¼ wavelength plate was 45° and the angle between the transmission axis of the lower polarizer and that of an upper polarizer was 9°.

Figure 3:
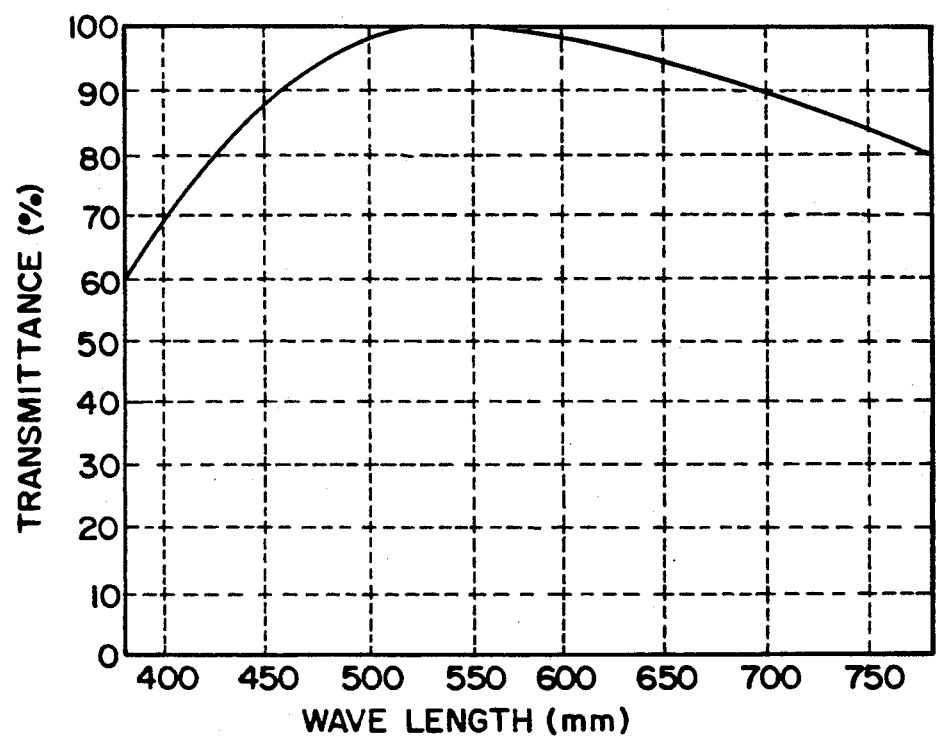
FIG. 3 illustrates an optical rotatory power of a ½ wavelength plate in Comparative Example 1.

Next, white light was made incident from the lower polarizer side and a transmission spectrum of transmitted light from the upper polarizer was measured. As a result, there was obtained such a spectrum as shown in FIG. 3. The transmissivity was almost 100% at 550 nm, but in the other wavelength region the transmissivity was fairly lower than 100%. Thus, it is apparent that the ¼ wavelength plate, in comparison with the optical rotator of the present invention, does not exhibit a satisfactory optical rotatory power in other wavelengths than a certain, single wavelength.

Since in the optical rotator of the present invention the twisted nematic liquid crystal structure is immobilized completely, the optical rotator exhibits a highly accurate optical rotatory power in all wavelength regions, and the azimuthal rotational angle and rotating direction of polarization can be set freely; besides, it is easy for the optical rotator of the invention to have a large area. Further, the optical rotator of the invention is easy to manufacture, inexpensive, and is of great industrial value in the fields of optics and optoelectronics, particularly in the field of display.

What is claimed is:

1. An optical rotator comprising a light transmitting base; an alignment film layer formed on said base; and a film layer formed of a liquid crystalline polyester which includes an ortho-substituted aromatic unit which exhibits twisted nematic orientation in the state of liquid crystal and assumes a glassy state at a temperature below the liquid crystal transition point of the polyester.

2. An optical rotator as set forth in claim 1, wherein said liquid crystalline polyester is an optically active, main chain type or side chain type liquid crystalline polymer.

3. An optical rotator as set forth in claim 1, wherein said liquid crystalline polyester is a combination of a main chain type or side chain type liquid crystalline polyester which is not optically active and an optically active compound.

4. An optical rotator as set forth in claim 1, wherein said alignment film layer is a polyimide film which has been subjected to a rubbing treatment, an obliquely vapor-deposited film of silicon oxide, a polyvinyl alcohol film which has been subjected to a rubbing treatment, or a film obtained by subjecting a light transmitting base to a rubbing treatment directly.

5. An optical rotator as set forth in claim 1, wherein said liquid crystalline polyester film layer has a thickness in the range of 2 to 1,000 μm.

* * * * *